(12) United States Patent
Joho

(10) Patent No.: US 7,346,974 B2
(45) Date of Patent: Mar. 25, 2008

(54) METHOD FOR PRODUCING A CONDUCTOR BAR OF TRANSPOSED STRANDED CONDUCTORS

(75) Inventor: Reinhard Joho, Rombach (CH)

(73) Assignee: Alstom Technology Ltd, Baden (CH)

( * ) Notice: Subject to any disclaimer, the term of this patent is extended or adjusted under 35 U.S.C. 154(b) by 373 days.

(21) Appl. No.: 11/048,018

(22) Filed: Feb. 1, 2005

(65) Prior Publication Data

US 2005/0168096 A1     Aug. 4, 2005

(30) Foreign Application Priority Data

Feb. 2, 2004   (DE) ................... 10 2004 005 033

(51) Int. Cl.
*H02K 15/00* (2006.01)
(52) U.S. Cl. .................. 29/596; 29/605; 29/825; 310/213
(58) Field of Classification Search ............. 29/596, 29/605, 825; 310/213
See application file for complete search history.

(56) References Cited

U.S. PATENT DOCUMENTS

| 587,764 A | 8/1897 | Short |
| 1,144,252 A | 6/1915 | Roebel |
| 2,436,188 A * | 2/1948 | Bilodeau ................... 336/70 |
| 2,821,641 A * | 1/1958 | Ringland ................... 310/213 |
| 3,154,112 A * | 10/1964 | St. Jacques .............. 140/71 R |
| 3,283,280 A * | 11/1966 | Fischer ................... 336/187 |
| 3,647,932 A * | 3/1972 | Heller et al. ............. 174/34 |
| 3,925,745 A * | 12/1975 | Blewitt ................... 337/279 |
| 4,128,779 A * | 12/1978 | Salon .................... 310/213 |
| 4,260,924 A * | 4/1981 | Lugosi et al. ............ 310/213 |
| 4,337,567 A * | 7/1982 | Lugosi et al. ............ 29/596 |
| 4,439,256 A | 3/1984 | Meserve .................. 156/50 |
| 4,650,924 A | 3/1987 | Kauffman et al. ......... 174/117 |
| 2002/0050395 A1 | 5/2002 | Kusumoto et al. ........ 174/128.2 |

(Continued)

FOREIGN PATENT DOCUMENTS

AT     118021     7/1929

(Continued)

OTHER PUBLICATIONS

J. Gruenenwald et al.: "Rotor Water Cooling in Trubogenerators Leads the Way to a New Design Concept", cigré, International Conference on Large High Voltage Electric Systems, 1980 Session—Aug. 27-Sep. 4.

(Continued)

*Primary Examiner*—Carl J. Arbes
(74) *Attorney, Agent, or Firm*—Darby & Darby

(57) ABSTRACT

A method for producing a conductor bar including transposed stranded conductors for a large, rotating electric machine. The method includes a first step of cabling a plurality of electrically insulated individual wires to form a plurality of identical stranded conductors having an essentially circular cross section. In a second step the stranded conductors are helically wound around a winding spindle in the manner of a Roebel transposition so as to form a conductor loop, wherein the winding has a profile adapted to a final cross sectional shape of the conductor bar. In a third step, the winding spindle removed from the conductor loop. In a fourth step, the conductor loop undergoes a press-forming procedure that gives it the final cross sectional shape, especially, for example, a rectangular shape.

38 Claims, 7 Drawing Sheets

U.S. PATENT DOCUMENTS

2002/0079783 A1  6/2002  Hopeck ............ 310/261

FOREIGN PATENT DOCUMENTS

| CH | 532 860 | | 1/1973 |
|---|---|---|---|
| DE | 32 41 506 | | 5/1984 |
| DE | G 83 21 135 | | 1/1985 |
| EP | 0 120 154 | * | 8/1984 |
| JP | 62-100144 | | 5/1987 |

OTHER PUBLICATIONS

M. Watanabe et al.: "Experimental Study of a Practical Airgap Winding Stator Arrangement for Large Turbine Generators", IEEE Transactions on Power Apparatus and Systems, vol. PAS-100, No. 4, Apr. 1981.

German Search Report for DE 10 2004 005 033.3 with brief translation.

* cited by examiner

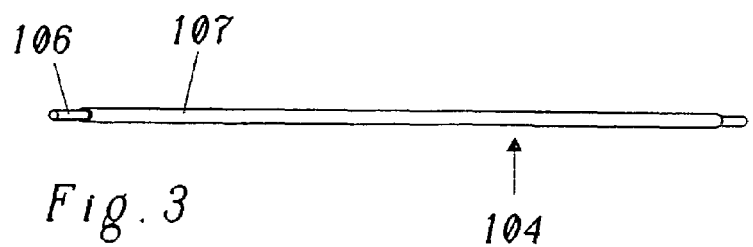
Fig. 3
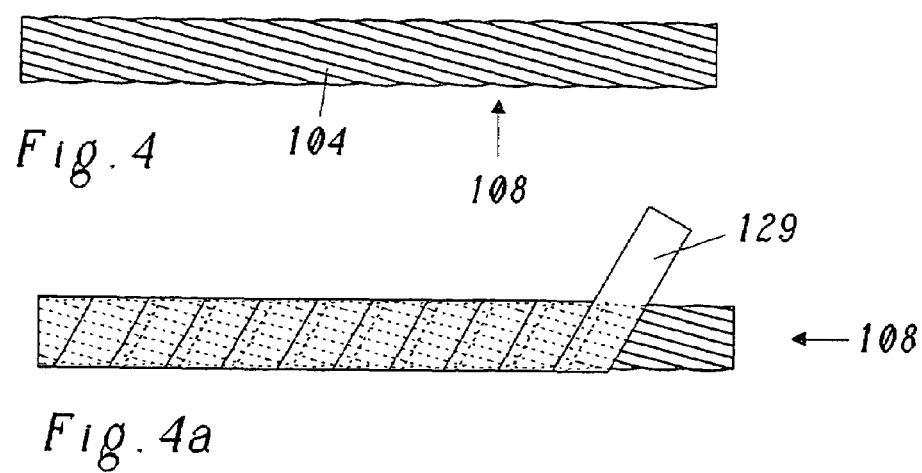
Fig. 4
Fig. 4a
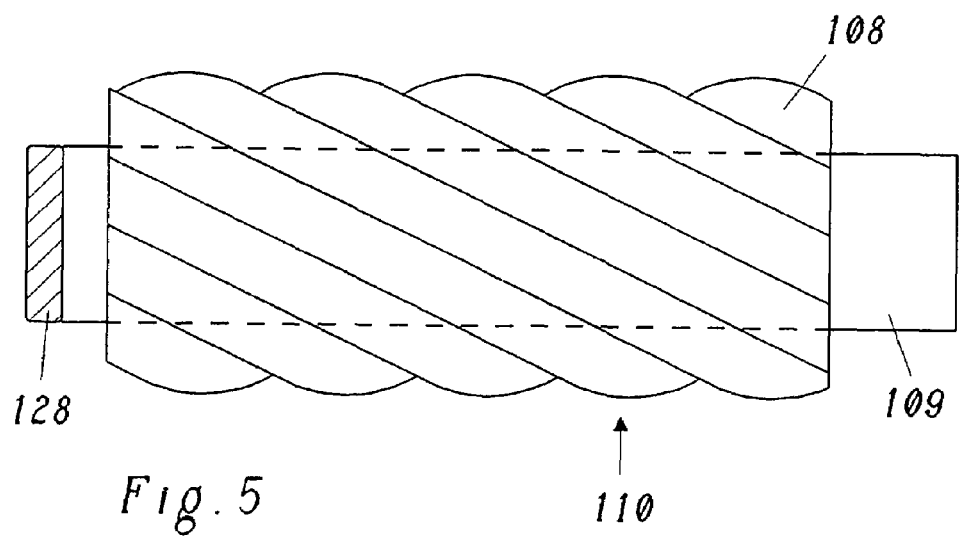
Fig. 5

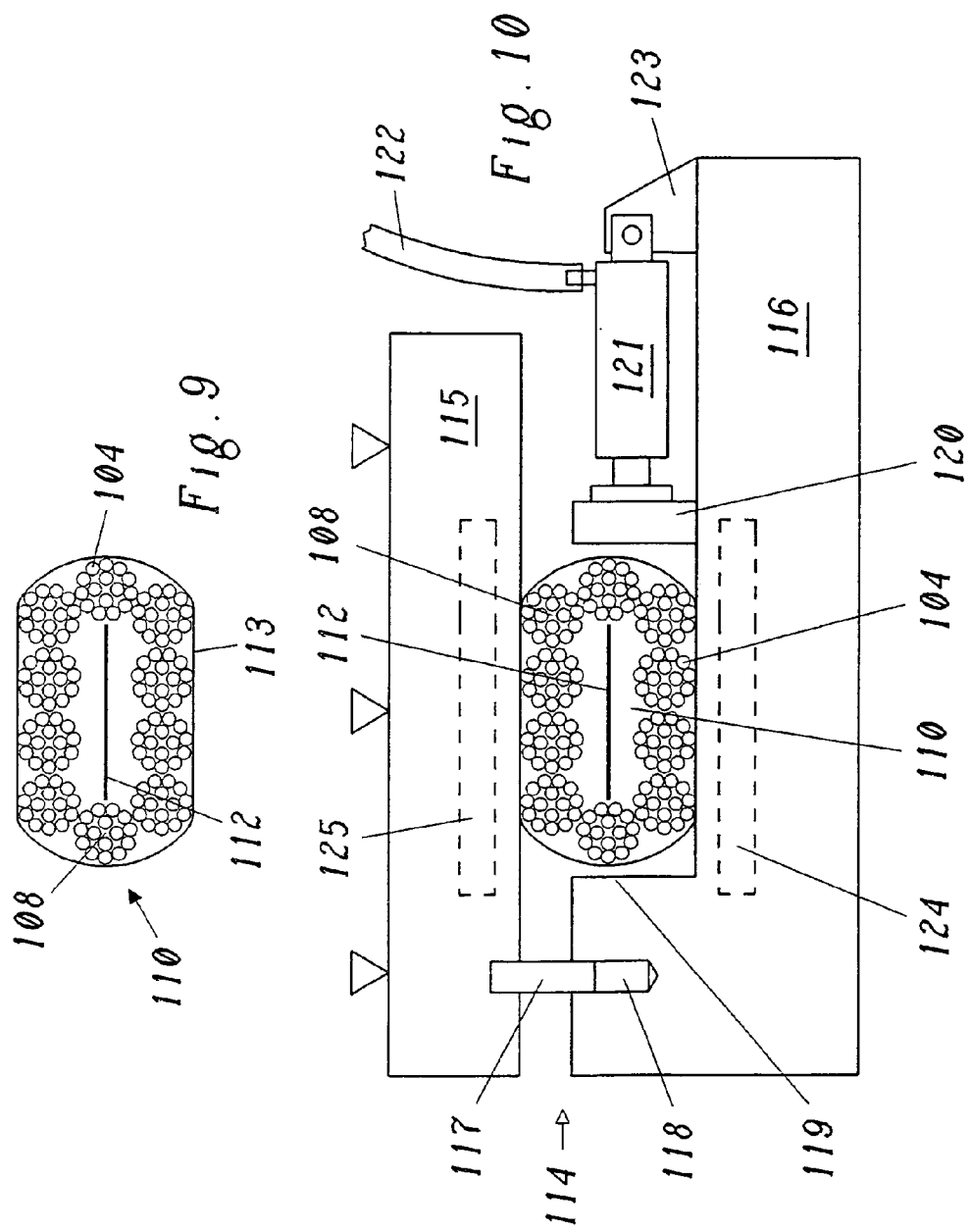

METHOD FOR PRODUCING A CONDUCTOR BAR OF TRANSPOSED STRANDED CONDUCTORS

Priority is claimed to German Patent Application No. DE 10 2004 005 033.3, filed Feb. 2, 2004, the entire subject matter or which is incorporated by reference herein.

The present invention relates generally to the field of electric machinery and more particularly to a method for producing a conductor bar of Roebel-transposed stranded conductors for a large, rotating electric machine.

BACKGROUND

Stator windings of large generators include conductor bars in the form of so-called Roebel bars (see, for example, U.S. Pat. No. 1,144,252, which is incorporated by reference herein). The conductor bars are exposed to the self-consistent magnetic field as well as to the main field of the machine. A subdivision into component conductors with a twist as is done with Roebel bars reduces the eddy current losses and the circulating current losses to an acceptable level.

In the 1970s, studies were carried out on air-gap windings for power limit generators with liquid-cooled or superconductive rotors. Here, the incentive existed to use Roebel bars with cabled stranded conductors (see, for example, Swiss publication CH 532 860 and Japanese publication JP-A 62100144).

These bars were consistently liquid-cooled. Here, the primary aim of the design was to achieve good thermal contact between the conductors and the cooling tube. It was likewise described that stranded cables were first press-formed into approximately rectangular component conductors, after which the solid copper component conductors were transposed (i.e. Roebel-transposed) to form the Roebel bar. The difficult process of cranking (FIG. 2 of U.S. Pat. No. 1,144,252), which is even more difficult for such pre-press-formed stranded conductors than for solid component conductors, is not described in these patent specifications.

It is also a known procedure (US-A1-2002/0050395, incorporated by reference herein) to use rectangular stranded bars that have been integrally press-formed into windings and that consist of a plurality of insulated copper wires, without Roebel transposition, in small high-frequency alternators in automotive technology. Due to the absence of systematic position traveling along the entire cross section of the conductor, undesired circulating currents occur beyond a certain conductor size.

German utility model DE G8321135.1 describes Roebel-transposed stranded conductors for all kinds of coils. The conductors described can be shaped so as to have a rectangular cross section. Here, the conductors remain semi-finished products, that is to say, in a subsequent step, they can be wound to form coils, for example, in transformers. Consequently, no description is given of the compacting and permanent strengthening procedures.

SUMMARY OF THE INVENTION

An objective of the present invention is to provide a method for producing a compacted, strengthened conductor bar of Roebel-transposed stranded conductors, the method allowing a simplified and flawless Roebel transposition and being particularly suitable for use in indirectly cooled conductor bars.

The present invention provides a method for producing a conductor bar of transposed stranded conductors for a large, rotating electric machine. In a first step of the method, a plurality of electrically insulated individual wires are cabled so as to form a plurality of identical stranded conductors each having an essentially circular cross section. In a second step, the stranded conductors are helically wound around a winding spindle according to a Roebel transposition so as to form a conductor loop, the winding spindle having a profile adapted to a final cross sectional shape of the conductor bar. In a third step, the winding spindle is removed from the conductor loop, and in a fourth step, a press-forming procedure is performed on the conductor loop so as to give the conductor loop the final cross sectional shape.

The cabled stranded conductors are not press-formed and compacted to form component conductors having a rectangular cross section prior to the Roebel transposition, but rather, first of all, the non-press-formed stranded conductors are Roebel-transposed by winding them helically onto a flat spindle so as to form an approximately rectangular outer contour, after which the Roebel-transposed conductor loop is press-formed into the final shape of the conductor bar. As a result of the fact that (1) the Roebel transposition takes place before the stranded conductor is press-formed and that (2) the conductor loop already has a roughly rectangular contour, the bar production process is greatly simplified and the insulated individual wires in the stranded conductors are mechanically stressed to a considerably lesser extent. The Roebel transposition is preferably carried out at a constant rate along the entire length of the bar.

A first preferred embodiment of the invention is characterized in that, prior to the second step, each stranded conductor is helically wrapped with an electrically insulating tape, preferably in an overlapping manner, in that a stretchable fabric that is permeable to impregnating resin is employed as the tape and in that the tape is stretched as it is wound onto the stranded conductor.

A second preferred embodiment of the method according to the invention is characterized in that, after the third step and before the fourth step, a thin, strip-like intermediate insulating layer is inserted into the hollow space left behind in the conductor loop by the removal of the winding spindle, whereby this intermediate insulating layer consists of a thin strip of a heat-resistant, voltage-proof, mechanically deformable insulating material, especially of a strip of an aromatic polyamide polymer that is a few tenths of a millimeter thick, preferably a 0.13 mm-thick strip of Nomex®. The insertion of the intermediate insulating layer translates into additional safety against electric short-circuiting among the individual wires of intersecting stranded conductors during the subsequent press-forming. Preferably, the insertion procedure is carried out in that the winding spindle is pulled out of the conductor loop in the lengthwise direction and in that the intermediate insulating layer is pulled into the conductor loop at the same time as the winding spindle is pulled out.

A third preferred embodiment of the method according to the invention is characterized in that the finished conductor bar has a rectangular cross section and in that a profile having a rectangular cross section and rounded-off edges is employed as the winding spindle. The use of a winding spindle having rounded-off edges reliably avoids damage to the individual wires located inside. The profile is preferably made of metal that is harder than the bar materials. It can have a polished surface so that it is easier to pull out of the conductor loop (continuously or section-wise). As an alternative, the surface can be provided with a smooth, gliding coating.

Preferably, the individual wires of the conductor loop are glued together in the fourth step during the press-forming procedure, whereby the individual wires are glued together by heating up the conductor loop in a press-forming device before and/or during the press-forming procedure; separating means are provided between the conductor loop and the press-forming device in order to separate the conductor loop from the press-forming device. Preferably, prior to the press-forming procedure, the outside of the conductor loop is covered with a separating means, especially wrapped with a separating film, whereby a separating film made of polyvinyl fluoride (PVF), especially made of Tedlar®, has proven its worth. However, it is also conceivable for the press-forming device to be provided with a separating coating as the separating means such as, for instance, Teflon® in a titanium oxide matrix.

If the individual wires have a heat-resistant insulation, particularly one made of enamel, the conductor loop is impregnated with a binder in the form of an easily penetrating, heat-curing resin in preparation for the gluing operation before the fourth step. This can be done, for example, by controlled brushing or spraying.

However, for gluing purpose, it is also conceivable for the individual wires to be coated over the insulation or enamel with a self-bonding lacquer (a partially cross-linked resin) that melts under the effect of heat. The coating thickness can be adjusted in such a way that all of the hollow spaces are exactly filled with resin during the compacting.

Here, in order to improve the thermal conductivity of the finished conductor bar, it can be advantageous for the heat-curing resin or the self-bonding lacquer to contain an additive for increasing the thermal conductivity, especially boron nitride with a particle size ranging from 0.1 µm to 20 µm.

Circulating current losses in the Roebel-transposed stranded bar can be assumed to be negligibly small. The additional electric losses then consist of the eddy current losses and amount to the following per individual wire:

$$P_z = \frac{\pi^3}{32}\kappa f^2 B^2 l D^4$$

wherein
κ=specific electric conductivity
f=frequency
B=magnetic flux density
l=length of the wire
D=diameter of the wire Round wires made of copper and having a conductor diameter ranging from 0.5 mm to 1.2 mm, especially from 0.8 mm to 1.0 mm, have proven their worth as individual wires for the invention.

The number of individual wires per bar is determined by the height and width of the bar and by the previously known filling factor (=copper cross section/bar cross section), which is approximately 70%. Depending on the machine size and frequency spectrum, a bar can be provided with 8 to 20 stranded conductors and one stranded conductor can consist of 40 to 400 individual wires.

In order to prevent excessive shifting and creasing of the separating layer or separating film during the press-forming procedure, it can be advantageous to pre-press-form the conductor loop to approximately the cross section contour of the finished conductor bar already prior to applying the separating means or the separating film.

Particularly compact conductor bars are obtained when the cabling of the individual wires to form the stranded conductors and the Roebel-transposing of the stranded conductors to form the conductor loop are both carried out in the same direction of rotation. This results in an especially smooth outer contour of the bar.

However, it is also conceivable for the cabling of the individual wires to form the stranded conductors and for the Roebel-transposing of the stranded conductors to form the conductor loop to be carried out in opposite directions of rotation.

The stranded conductors can consist of several concentric layers of individual wires. When the individual wires are cabled to form the stranded conductors, preferably all of the layers of individual wires have the same direction of rotation. This avoids unnecessary intersections of the individual wires, which has a positive influence on the filling factor and on the absence of short circuits. Instead of a layer arrangement, a number of drawn individual wires can be bundled and twisted with each other to form a stranded conductor.

Easier press-forming and improved compacting are attained in that soft copper wires are used as the individual wires. This is achieved in that the wire is soft-annealed after the drawing but before the application of the enamel.

Moreover, it can be advantageous for at least every other stranded conductor to be wrapped with a thin, stretchable filament or with a thin, flexible, preferably resin-permeable, tape prior to the second step in order to protect the individual wires when they are wound onto the winding spindle.

It is also possible and advantageous in the production process for the stranded conductors to be wound in parallel onto the winding spindle and for the conductor loop thus formed to be pulled off of the winding spindle continuously or section-wise.

The production is also facilitated if, in the fourth step, the press-forming procedure simultaneously gives the conductor loop the cross sectional shape, especially the rectangular shape, intended for the finished conductor bar along the entire length of what will later be the conductor bar, whereby both ends of the bars acquire the definitive conductor curvature that corresponds to the geometry of the overhang. The finished conductor bar is then subsequently provided with the bar main insulation in a known manner.

The conductor bar according to the invention which is to be used for large, rotating electric machines and which is made up of a plurality of individual wires that are cabled and glued together, is characterized in that it is produced by means of a method according to one of claims 1 to 22.

BRIEF EXPLANATION OF THE FIGURES

The invention will be explained in greater detail below with reference to embodiments in conjunction with the drawing. The following is shown:

FIG. 3—in a side view, a section of an insulating individual wire by way of an example, of the type that can be used for the production of a conductor bar according to the invention;

FIG. 4—in a side view, a section of a cabled stranded conductor consisting of several individual wires according to FIG. 3;

FIG. 4a—in a side view, the wrapping of the stranded conductor with a thin insulating tape;

FIG. 5—in a side view, a section of a conductor loop formed by winding or Roebel-transposing several stranded conductors according to FIG. 4 onto a flat winding spindle;

FIG. 9—a cross-sectional view of the conductor loop from FIG. 8 wrapped in a separating film;

FIG. 10—the conductor loop placed into the press-forming device;

WAYS TO EXECUTE THE INVENTION

Figure 1:
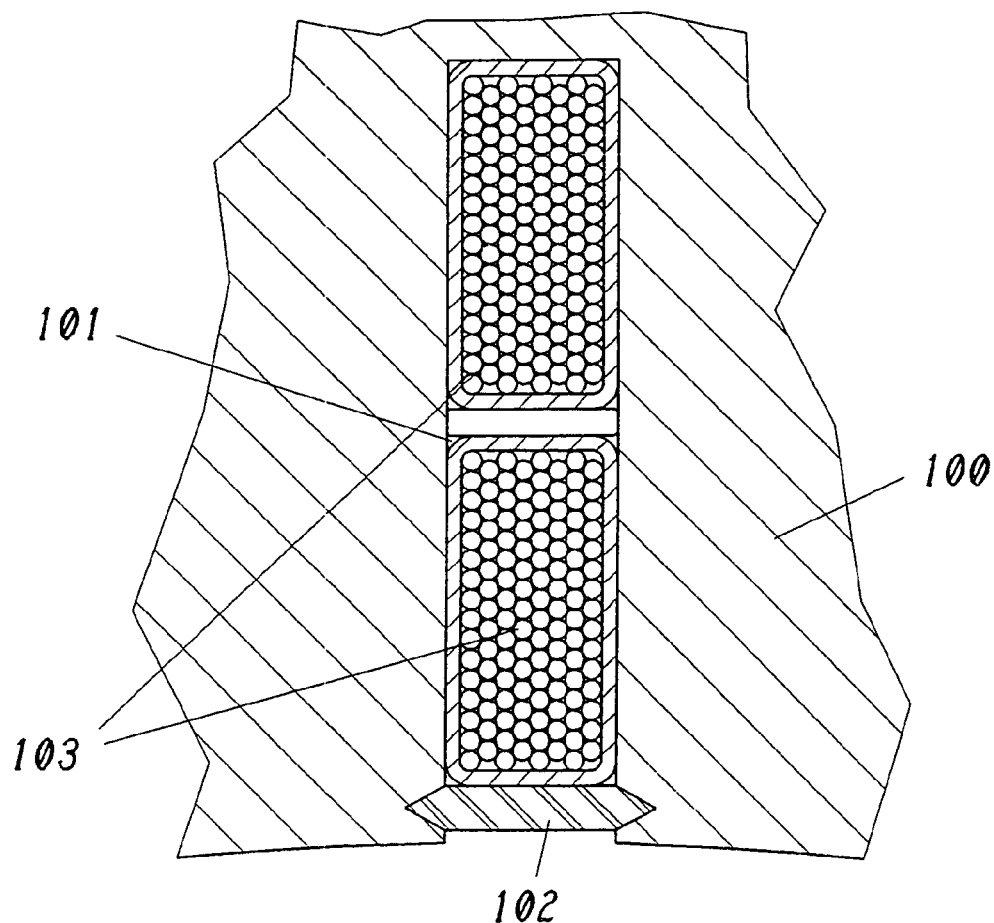
FIG. 1—a cross-sectional view of a section of a stator of a large, rotating electric machine with two conductor bars (Roebel bars) inserted into a slot, according to an embodiment of the invention.
Figure 2:
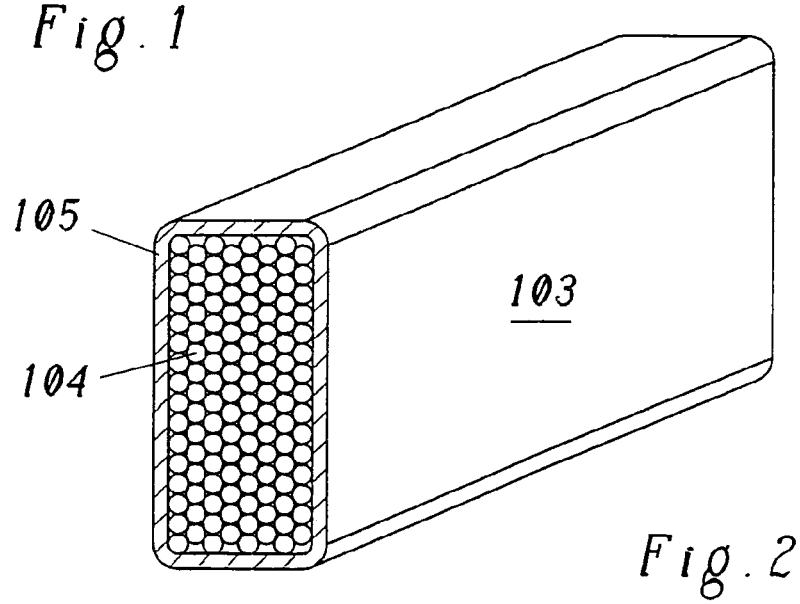
FIG. 2—a section of a conductor bar from FIG. 1 in a perspective view.

The invention relates to the production of a conductor bar 103 configured as a Roebel bar, two of which are inserted into the slot 101 of a stator 100 of a large generator and secured in place with a sealing wedge 102 as shown in FIG. 1 by way of an example. According to FIG. 2, the conductor bar 103 comprises a plurality of electrically insulated individual wires 104 and is surrounded by a main insulation 105 which usually consists of wrapping with tape on the basis of mica paper. The conductor bar 103 has been imparted with a rectangular cross-sectional shape by means of press-forming and this results in a good filling factor in the slot.

The method according to the invention is based on round individual wires 104 of the type shown in FIG. 3, which encompass a central conductor 106 having a circular cross section and are preferably made of soft conductor copper which is sheathed by electric insulation 107 along its entire length. The individual wires 104 have a copper diameter ranging from 0.5 mm to 1.2 mm, especially from 0.8 mm to 1.0 mm. The insulation 107 is rated in application class C1 or C2 and increases the diameter, for instance, by 6% to 10%. The insulation consists of a tough, temperature-resistant enamel coating, for example, made of polyester imide, polyamide imide or polyimide and can be additionally coated with a self-bonding lacquer that plays a role later on when the press-formed conductor bar is glued.

To start with, individual stranded conductors 108 are made from a plurality of individual wires 104 by means of multilayered cabling as shown in FIG. 4. A stranded conductor 108 can be made up of 40 to 400 individual wires. All individual wires are preferably wound in layers in the same direction. As an alternative, the stranded conductor 108 can be made from an arrangement of parallel wires that are subsequently bundled together and then twisted by rotating the arrangement. The pitch of the twisting is a function of the cross section of the stranded conductor and lies between 50 mm and 300 mm.

According to FIG. 4a, prior to the production of the bar, every stranded conductor is helically wrapped with a thin tape 129 made of electrically insulating, stretchable fabric, preferably in an overlapping manner. The tape 129 is permeable to impregnating resin. The tape is stretched as it is wound around the stranded conductor 108, so that the later compacting of the stranded conductor 108 can be carried out without creasing. Such an insulating tape 129 has a thickness ranging from 0.03 mm to 0.1 mm and can be made, for instance, of a yarn or fabric consisting of polyester fibers. The material can additionally have heat-shrinking properties.

Several of these stranded conductors 108 are then wound in parallel in the lengthwise direction in the manner of a Roebel transposition onto a flat winding spindle 109 that is preferably made of aluminum. The Roebel transposition step is preferably kept constant along the entire length of the bar and it amounts to a multiple of the commonly employed 360°. Essentially, the pitch modulus for the stranded conductor is set at 10% to 30%. In order to obtain the rectangular cross section shown in FIG. 2 in what will later be the conductor bar, the winding spindle 109 likewise has a rectangular cross section 128 (indicated by the cross-hatched surface in FIG. 5). The edges of the winding spindle 109 are rounded off in order to prevent damage to the individual wires that are bent around the edges.

Figure 6:
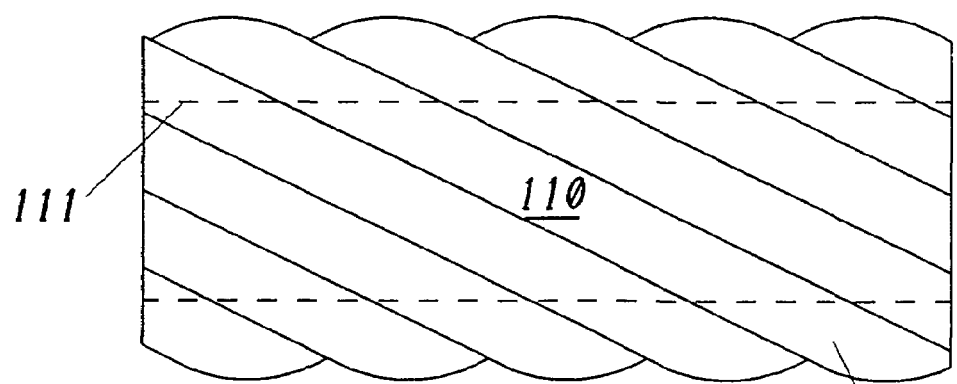
FIG. 6—the conductor loop according to FIG. 5 after the winding spindle has been pulled out.
Figure 7:
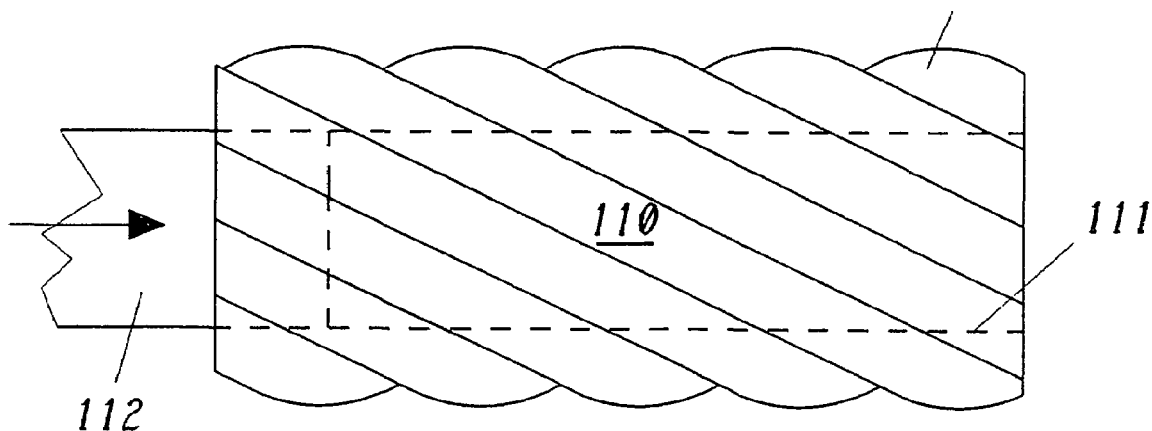
FIG. 7—the insertion of an intermediate insulating layer into the hollow space left behind by the winding spindle.
Figure 8:
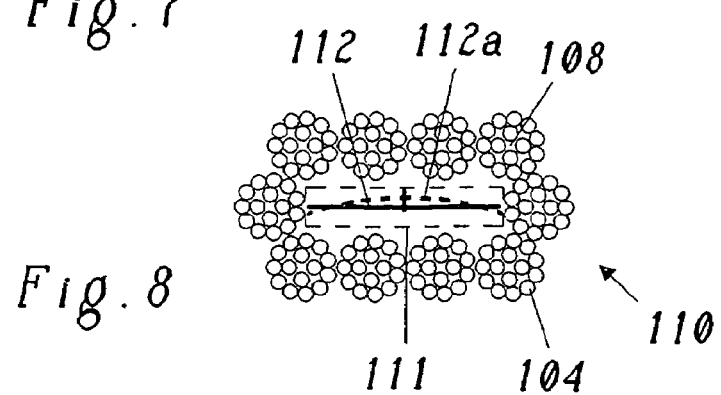
FIG. 8—a cross-sectional view of the conductor loop with an inserted intermediate insulating layer according to FIG. 7.

When the stranded conductor 108 is wound around the winding spindle 109, a conductor loop 110 is formed that displays an approximately rectangular hollow space 111 (FIGS. 6, 8) after the winding spindle 109 has been pulled out. Especially for the eventuality that the stranded conductor is not going to be wrapped with insulating tape, a thin, strip-like intermediate insulating layer 112 or 112a made of a heat-resistant, deformable insulating material is inserted into this hollow space 111 at the same time as or after the winding spindle 109 is pulled out (FIG. 7), thus resulting in the cross section of the conductor loop 110 shown in FIG. 8. The height of the intermediate insulating layer corresponds approximately to the height of the winding spindle (intermediate insulating layer 112 in FIG. 8). But it can also be slightly higher, which makes it easier to upset (intermediate insulating layer 112a in FIG. 8). The following, for instance, can be used as the material:

Aromatic polyamide (0.13-mm Nomex®), which is characterized by outstanding electric voltage strength even in case of strong mechanical distortion.

Glass or polyester woven fabric or nonwoven which, due to the structure of the woven fabric/nonwoven, ensures electric separation and also an excellent frictional connection thanks to its permeability to impregnating resin.

If enameled individual wires 104 have been used, the conductor loop 110 is then impregnated with a heat-curing resin in an appropriate manner, a process in which care should be taken to ensure that the filling factor of the finished conductor bar 103 is not reduced by an excessive application of resin. Once the conductor loop has been impregnated with resin, it is wrapped on the outside with a separating means 113 in the form of a separating film (for example, made of Tedlar®) (FIG. 9 shows the finished wrapped conductor loop). The separating film 13 prevents the resin-soaked conductor bar from adhering to the press-forming device 114 (FIG. 10).

The conductor loop 110 thus prepared is then laid into a suitable press-forming device 114, as depicted by way of an example in FIG. 10. The press-forming device 110 is designed in such a way that the conductor loop 110 can be consecutively press-formed and compacted first along the wide side and subsequently along the narrow side so as to form the conductor bar with a rectangular cross section. Concurrently with the press-forming procedure, the conductor loop 110 can be heated up in the press-forming device 114 in order to cure the resin inserted into the conductor loop 110 and thus to glue (bond) the individual wires 104 to each other. The heating procedure can also be utilized to start the melting of the self-bonding lacquer when the individual wires 104 are sheathed with an insulation 107 consisting of self-bonding lacquer.

The press-forming device 114 is advantageously structured and designed in such a way that it can form a Roebel bar with its complex three-dimensional shape in a single press-forming and gluing procedure. For purposes of illustrating the principle of the method, FIGS. 10 to 12 depict a simplified cross section of the press-forming device 114 which only relates to a short (straight) section of the Roebel bar.

The conductor loop 110 is placed with its wide side on a horizontal baseplate 116 of the press-forming device 114 in such a way that its narrow side (on the left-hand side in FIG. 10) approaches or comes into contact with a rectangular shoulder 119 of the baseplate 116. The shoulder 119 is part of the press mold during the press-forming of the narrow sides of the conductor loop 110. On the side of the conductor loop 110 that lies across from the shoulder 119, there is a pressing strip 120 that is arranged vertically on the baseplate 116 and that can be moved parallel to the horizontal pressing surface of the baseplate 116 towards the shoulder 119 by means of a hydraulic cylinder 121 powered via a pressure line 122. On the other end, the hydraulic cylinder 121 rests on a counter support 123 attached to the baseplate 116.

Above the baseplate 116, a pressing plate 115 is arranged parallel to the pressing surface of the baseplate 116, said pressing plate being moved or pushed towards the baseplate 116 by means of a pressure mechanism (not shown here). The movement of the pressing plate 115 relative to the baseplate 116 is guided by a guidance system (guide bar 117, guide slot 118) in order to prevent shearing loads. Flat heating devices 124, 125 (for example, in the form of electric resistance heaters) are arranged parallel to the pressing surfaces in the pressing plate 115 and in the baseplate 116, and they serve to heat up or heat-treat the press-formed material in a defined manner.

Figure 11:
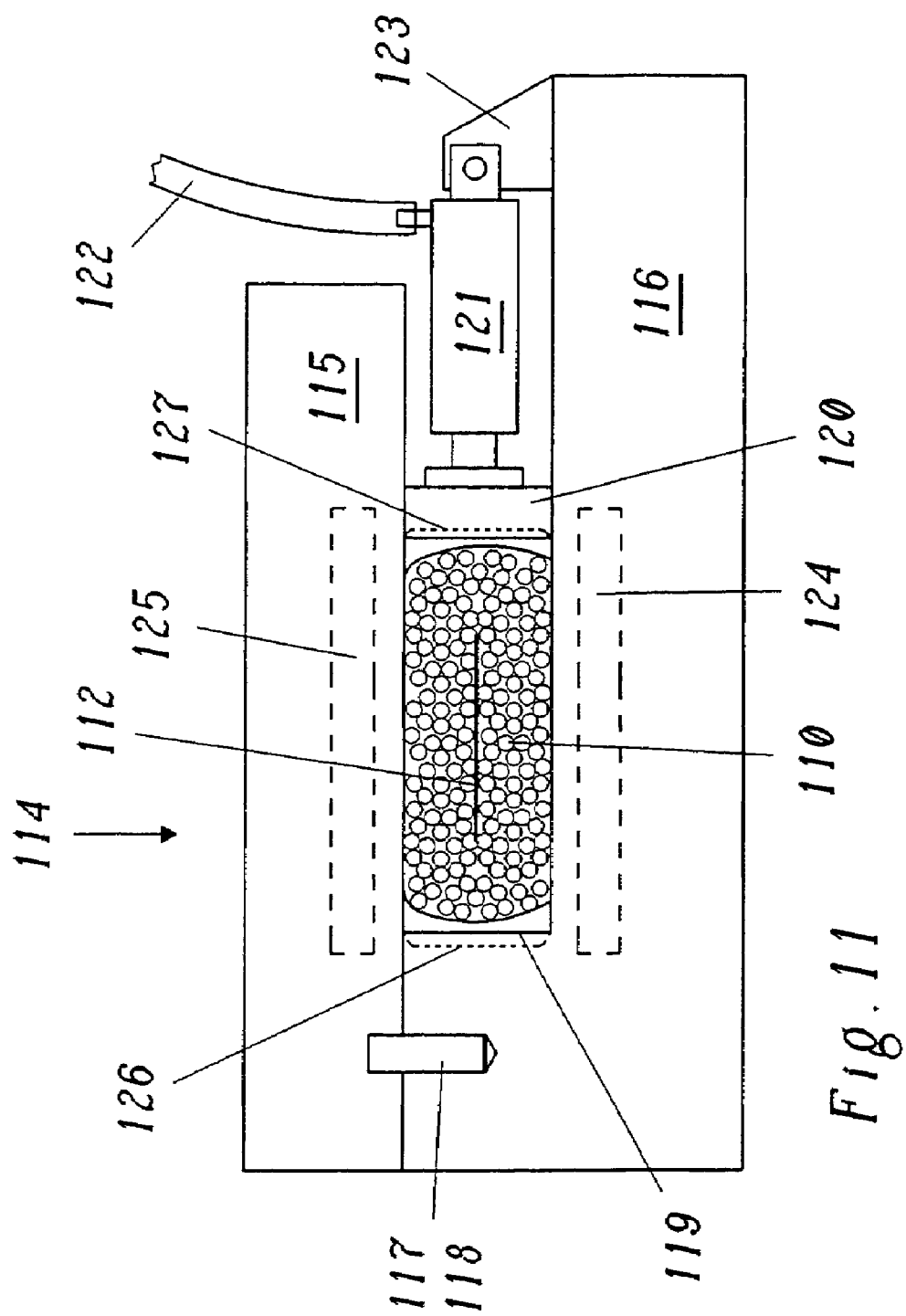
FIG. 11—the conductor loop press-formed into the bar format on the wide side.
Figure 12:
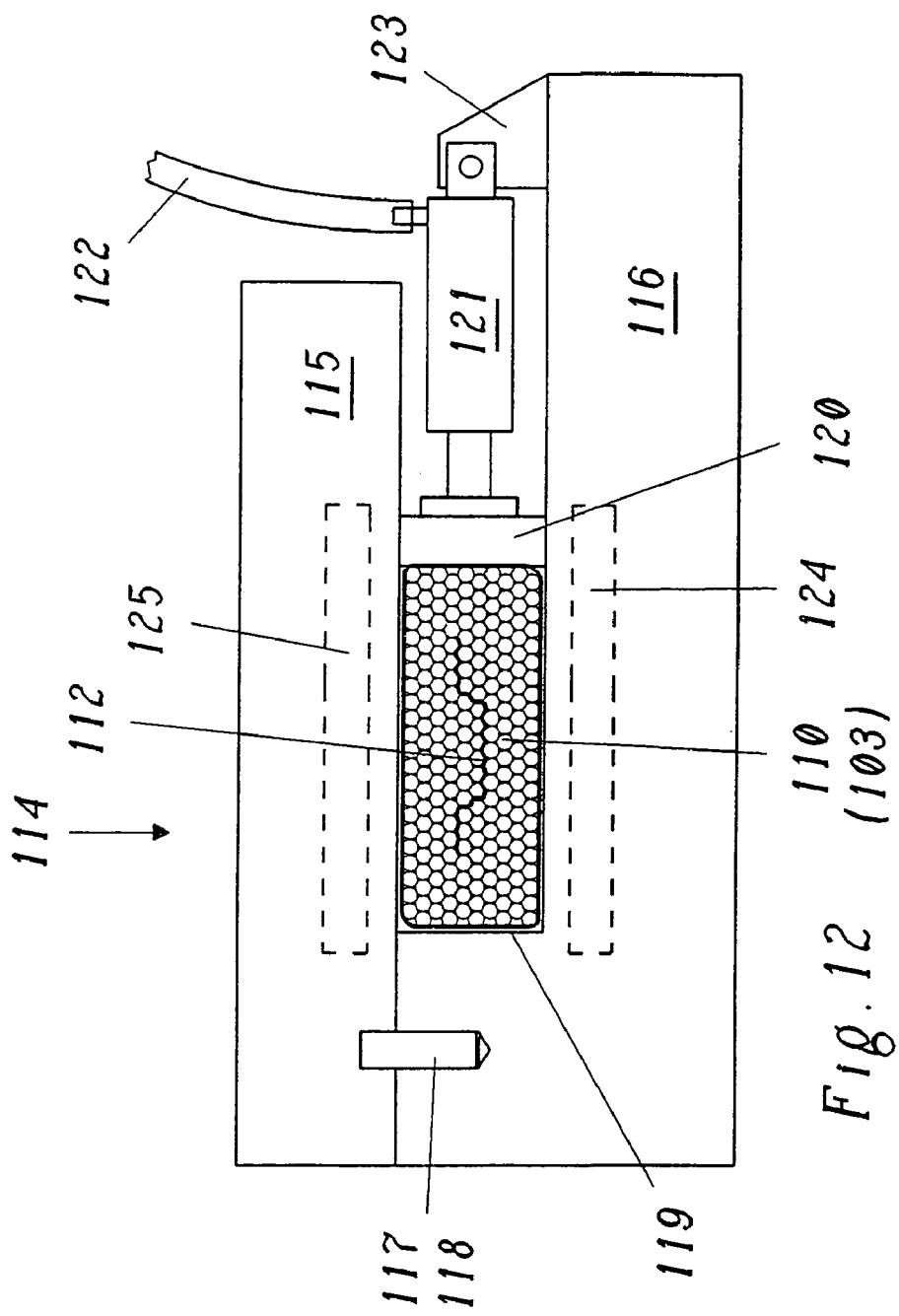
FIG. 12—the conductor loop press-formed into the bar format on the narrow side, forming the finished conductor bar (Roebel bar)

In a first press-forming procedure, the pressing plate 115 is then lowered towards the baseplate 116 until it strikes the stop (FIG. 11). As a result, the conductor loop 110 is compressed to the target width of what will later be the conductor bar 103 (without main insulation) and the hollow space 111 created by the removal of the winding spindle 109 virtually disappears.

In a second press-forming procedure, the pressing strip 120 is moved by means of the hydraulic cylinder 121 towards the shoulder 119 (FIG. 12). As a result, the conductor loop 110 is placed at the target height of what will later be the conductor bar 103. If concave recesses 126, 127 (drawn with broken lines in FIG. 11) are provided in the pressing surfaces of the shoulder 119 and of the pressing strip 120, the finished, press-formed conductor bar 103 acquires correspondingly rounded off edges. In this context, the intermediate insulating layer 112 deforms and adapts to the contours of the compacted stranded conductor.

Figure 13A:
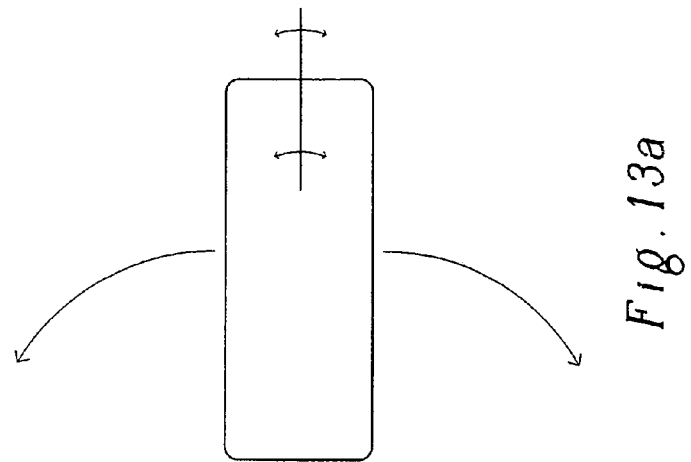
FIG. 13a—the sectional diagram that leads to the side view in FIG. 13.
Figure 13:
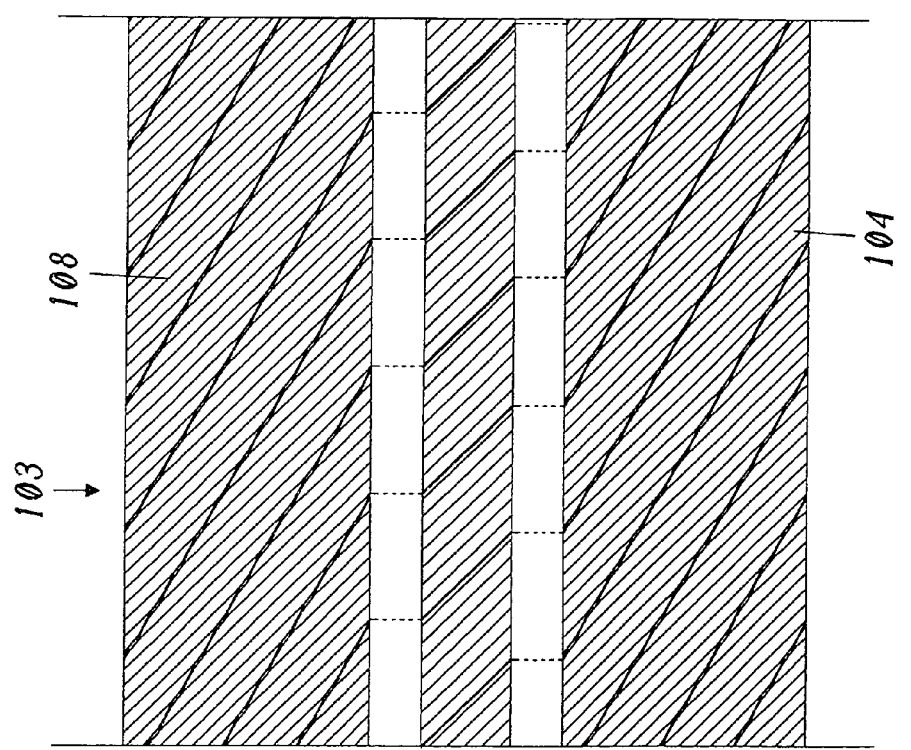
FIG. 13—a cutaway side view according to FIG. 13a of a section of the finished press-formed conductor bar, in which the cabling of the stranded conductors and the Roebel transposition have the same direction of rotation.

The finished press-formed conductor bar 103 without main insulation is then shown in FIG. 13 in a cutaway side view, whereby the sectional diagram is shown in FIG. 13a. This figure clearly shows the cabling of the individual wires 104 in the stranded conductors 108 which, in turn, have been cabled (Roebel-transposed) with the same direction of rotation in this depiction.

Within the scope of the invention the following changes or additional measures can be undertaken:

a) Instead of the impregnation with resin during the production of the bar, the wire can also be configured as a self-bonding lacquer wire. Here, an external coating is in the partially cross-linked state (B-state) and it can be melted once again by means of a heat treatment. The density of the self-bonding lacquer is selected with an eye towards achieving optimal filling of all of the cavities in the finished compacted bar. The intermediate insulating layer made of a thin glass or polyester woven fabric (0.15 mm to 0.5 mm-thick) is preferably likewise impregnated with resin in the B-state.

b) The filling resin or the self-bonding lacquer wire can be provided with an additive for purposes of increasing the heat conductivity (for instance, boron nitride in powder form having a particle size ranging from 0.1 μm to 20 μm).

c) The direction of rotation of the Roebel twist in the same direction as the cabling of the stranded conductors (FIG. 13) yields very good results in terms of the filling factor, the absence of short-circuits, the edge radius and the smooth outer surface of the bar.

d) Cables with just a few internal wire intersections (all wire layers applied in the same direction of rotation) ensure optimum wire filling.

e) A soft copper wire as the starting material results in good compacting and a good filling factor.

f) The winding spindle is flat. The cables are mechanically wound in parallel onto the spindle. The "conductor loop" thus formed is continuously or periodically removed from the spindle.

g) The intermediate insulating layer is added to the "conductor loop" starting from the winding spindle. It is fed along the wide side of the spindle or via a slit in the spindle. The intermediate layer has approximately the same height as the spindle.

h) Once the "conductor loop" has been cut into sections, it is stored and transported on a straight flat bed.

i) The "conductor loop" is stored and transported by being wound up onto a large cable drum.

j) An advantageous bar production process would involve a press-forming device for the entire length of the bar, including the curved parts in the overhang area. The press-forming device follows the curvature of the bar. First the wide side is press-formed against the stop and subsequently the narrow side is press-formed against the stop. The press-forming on the narrow side can be effectuated by means of a series of hydraulic cylinders. A pre-curved pressure strip ensures pressure equalization between the stamps of the hydraulic cylinders.

k) Starting in the middle of the bar, the press-forming tools 121 on the narrow side are consecutively charged with pressure. This procedure can also be carried out in waves of increasing pressure. In this manner, the bar is able to shift in the lengthwise direction during the press-forming procedure.

l) The narrow sides of the pressing mold can have concave recesses in order to round off the edges of the green bar.

m) The bar (the conductor loop) can be sealed off vis-à-vis the pressing mold by means of a preferably heat-shrinking separating film. The film made of smooth, gliding material ensures that the force that is last applied on the narrow side is exerted virtually hydrostatically into the entire cross section of the bar in order to achieve a high, uniform compacting (good filling factor, good heat conductivity). The separating film does not bond, so it can be easily removed after the curing. Suitable materials here are Tedlar® and Teflon®. In an advantageous manner, the conductor loop can be slightly pre-press-formed prior of the overlapping wrapping with the separating film.

n) The press-forming device can be provided with a gliding, separable coating on its inner surfaces (pressing surfaces) so as to attain the same effect as with a separating film. This coating can consist, for instance, of a titanium oxide matrix with Teflon sintered into it. This also simplifies the cleaning procedure (no wetting of the walls).

o) Method for press-forming with self-bonding lacquer wires: the mold is heated when the wide side is press-formed. This causes the self-bonding lacquer to melt and the wires can be easily compressed (the resin spreads). Immediately thereafter, the bar is press-formed on the narrow side, the press is then kept hot or else operated with a special program at varying temperatures until the final curing (optionally using a separating film or Teflon wall).

p) Method for press-forming with filling resin:
  a. filling resin is metered into the conductor loop, for instance, by spraying;
  b. the conductor loop is placed into the press-forming device, which is then heated up;
  c. first the wide side and immediately thereafter the narrow side are press-formed;
  d. the press-forming device is kept hot, or else operated with a special program at varying temperatures until the final curing (optionally using a separating film or Teflon wall).

q) For the electric coupling of an inner glow protection, after the green bar has been press-formed, its surface can be at least partially polished, preferably on the narrow side.

r) As an alternative to the concave recesses in the pressing surfaces, an edge radius that is larger and more advantageous in terms of the stressing of the main insulation can be applied onto the narrow sides in the form of a semi-conductive cement.

In summary, the following can be said:

The invention relates primarily to the field of indirectly cooled stator bars, especially to their production. These bars do not have any built-in cooling tubes and they release their dissipated heat via the main insulation. The idea consists of employing stranded conductors instead of conventional component conductors and to compact and strengthen the Roebel-transposed green bar (=bar without main insulation) in its entirety by means of mechanical press-forming. This compacting procedure is an indispensable prerequisite for the success of the stranded conductor. This achieves an acceptable filling factor of the conductor copper and the thermal conductance inside the stator is increased. The compacting procedure is especially trouble-free since there is no risk of short-circuiting to the cooling tubes or of the cooling tubes being crushed. Advantageously, a constant multiple Roebel-transposition is employed along the entire length of the bar.

The advantages of a stranded conductor produced by means of the method according to the invention are the following:

considerably fewer eddy current losses, which opens up completely new configuration possibilities for electric machines;

the diameter of the wires is chosen as a function of the application or of the magnetic field to which the bars are exposed. Bars that lie in conventional slots have a wire copper diameter ranging from 0.8 mm to 1.2 mm, while bars of air-gap windings have a wire diameter ranging from 0.5 mm to 1.0 mm. Thus, a universal diameter that is suitable for all applications is possible within the cross sectional range from 0.8 mm to 1.0 mm. These specifications refer to machine frequencies for the mains frequency of 50/60 Hz. Higher frequencies (high-speed rotors) could require even smaller diameters;

suitable for future generators fitted with high-speed rotors for operating current converters where particularly high losses occur in conventional conductors due to the higher frequency components and where special bars are indispensable;

suitable for air-gap windings of large electric machines, especially those with superconductive rotor windings.

The advantages of the method of total press-forming according to the invention in comparison to the state of the art are the following:

simple production by means of the following steps: winding the non-press-formed strand conductors onto the flat spindle, pulling out the spindle, impregnating, press-forming and curing the conductor loop;

good filling factor in the cranked area since the stranded conductor changes sides in a continuum;

when press-formed, the wires line up properly with respect to each other in the bundle, that is to say, there is a good filling factor and there are no short-circuits. The individual wire is advantageously a commercially available, round, enameled winding wire.

What is claimed is:

1. A method for producing a conductor bar of transposed stranded conductors for a large, rotating electric machine, the method comprising:

in a first step, cabling a plurality of electrically insulated individual wires so as to form a plurality of identical stranded conductors each having an essentially circular cross section;

in a second step, helically winding the stranded conductors around a winding spindle according to a Roebel transposition so as to form a conductor loop, the winding spindle having a profile adapted to a final cross sectional shape of the conductor bar;

in a third step, removing the winding spindle from the conductor loop; and in a fourth step, performing a press-forming procedure on the conductor loop so as to give the conductor loop the final cross sectional shape, wherein the final cross sectional shape is constant along a length of the conductor bar.

2. The method as recited in claim 1, wherein the final cross-sectional shape is rectangular.

3. The method as recited in claim 1, wherein the removing of the winding spindle leaves an empty space in the conductor loop and wherein the method further comprises inserting a strip-like intermediate insulating layer into the hollow space before the fourth step, the intermediate insulating layer being thinner than the winding spindle.

4. The method as recited in claim 3, wherein the intermediate insulating layer includes a thin strip of a heat-resistant, voltage-proof, mechanically deformable insulating material.

5. The method as recited in claim 3, wherein the removing of the winding spindle is performed in a lengthwise direction and wherein the inserting of the intermediate insulating layer is performed at the same time as the removing of the winding spindle.

6. The method as recited in claim 2, the profile of the winding spindle has a rectangular cross section and rounded-off edges.

7. The method as recited in claim 1, wherein the fourth step includes gluing together the individual wires during the press-forming procedure.

8. The method as recited in claim 7, wherein the gluing is performed by heating up the conductor loop in a press-forming device before and/or during the press-forming procedure and further comprising disposing a separating element between the conductor loop and the press-forming device so as to separate the conductor loop from the press-forming device.

9. The method as recited in claim 8, wherein the conductor loop includes an outside and wherein the disposing of the separating element includes covering the outside of the conductor loop prior to performing the press-forming procedure.

10. The method as recited in claim 9, wherein the separating element is a separating film including a polyvinyl fluoride (PVF).

11. The method as recited in claim 8, wherein the separating element includes a separable coating provided on the press-forming device.

12. The method as recited in claim 7, wherein the individual wires have a heat-resistant insulation and further comprising impregnating the conductor loop before the fourth step with a binder including an easily penetrating, heat-curing resin.

13. The method as recited in claim 12, further comprising coating the individual wires over the insulation with a self-bonding lacquer that melts under the effect of heat.

14. The method as recited in claim 12, wherein the heat-curing resin contains an additive for increasing a thermal conductivity of the conductor bar.

15. The method as recited in claim 1, wherein the individual wires include round wires made of copper and having a conductor diameter ranging from 0.5 mm to 1.2 mm.

16. The method as recited in claim 9, further comprising performing a pre-press-forming procedure prior to disposing the separating element so as to give the conductor loop a cross sectional shape that approximates the final cross sectional shape.

17. The method as recited in claim 1, wherein the cabling of the individual wires and the winding of the stranded conductors are both carried out in the same rotational direction.

18. The method as recited in claim 1, wherein the cabling of the individual wires and the winding of the stranded conductors are carried out in opposite rotational directions.

19. The method as recited in claim 1, wherein the cabling is performed to form a plurality of identical stranded conductors each including a plurality of concentric layers of the individual wires having the same direction of rotation.

20. The method as recited in claim 1, wherein the individual wires are made of soft copper.

21. The method as recited in claim 1, further comprising wrapping at least every second one of the stranded conductors with a thin, stretchable filament or tape prior to the second step so as to protect the individual wires during the winding step.

22. The method as recited in claim 1, wherein the winding is performed so that the stranded conductors are wound in parallel onto the winding spindle and wherein the removing of the conductor loop includes pulling the conductor loop off of the winding spindle continuously or section-wise.

23. The method as recited in claim 1, wherein the press-forming procedure is performed so as to simultaneously gives the conductor loop the final cross sectional shape along the entire length of the conductor loop.

24. The method as recited in claim 1, further comprising helically winding each stranded conductor with an electrically insulating tape prior to the second step.

25. The method as recited in claim 24, wherein the insulating tape includes a stretchable fabric permeable to impregnating resin, and wherein the tape is stretched as it is wound onto the stranded conductor.

26. The method as recited in claim 24, wherein the insulating tape has a thickness ranging from 0.03 mm to 0.1 mm and includes a yarn or fabric including polyester fibers.

27. A method for producing a conductor bar of transposed stranded conductors for a large, rotating electric machine, the method comprising:
    in a first step, cabling a plurality of electrically insulated individual wires so as to form a plurality of identical stranded conductors each having an essentially circular cross section;
    in a second step, helically winding the stranded conductors around a winding spindle according to a Roebel transposition so as to form a conductor loop, the winding spindle having a profile adapted to a final cross sectional shape of the conductor bar;
    in a third step, removing the winding spindle from the conductor loop; and
    in a fourth step, performing a press-forming procedure on the conductor loop so as to give the conductor loop the final cross sectional shape, wherein the fourth step includes, gluing together the individual wires during the press-forming procedure, wherein the gluing is performed by heating up the conductor loop in a press-forming device before and/or during the press-forming procedure and further comprising disposing a separating element between the conductor loop and the press-forming device so as to separate the conductor loop from the press-forming device.

28. The method as recited in claim 27, wherein the conductor loop includes an outside and wherein the disposing of the separating element includes covering the outside of the conductor loop prior to performing the press-forming procedure.

29. The method as recited in claim 28, wherein the separating element is a separating film including a polyvinyl fluoride (PVF).

30. The method as recited in claim 27, wherein the separating element includes a separable coating provided on the press-forming device.

31. A method for producing a conductor bar of transposed stranded conductors for a large, rotating electric machine, the method comprising:
    in a first step, cabling a plurality of electrically insulated individual wires so as to form a plurality of identical stranded conductors each having an essentially circular cross section;
    in a second step, helically winding the stranded conductors around a winding spindle according to a Roebel transposition so as to form a conductor loop, the winding spindle having a profile adapted to a final cross sectional shape of the conductor bar;

in a third step, removing the winding spindle from the conductor loop; and in a fourth step, performing a press-forming procedure on the conductor loop so as to give the conductor loop the final cross sectional shape, wherein the fourth step includes gluing together the individual wires during, the press-forming procedure, wherein the individual wires have a heat-resistant insulation and further comprising impregnating the conductor loop before the fourth step with a binder including an easily penetrating, heat-curing resin.

32. The method as recited in claim 31, further comprising coating the individual wires over the insulation with a self-bonding lacquer that melts under the effect of heat.

33. The method as recited in claim 31, wherein the heat-curing resin contains an additive for increasing a thermal conductivity of the conductor bar.

34. The method as recited in claim 28, further comprising performing a pre-press-forming procedure prior to disposing the separating element so as to give the conductor loop a cross sectional shape that approximates the final cross sectional shape.

35. A method for producing a conductor bar of transposed stranded conductors for a large, rotating electric machine, the method comprising:

in a first step, cabling a plurality of electrically insulated individual wires so as to form a plurality of identical stranded conductors each having an essentially circular cross section;

in a second step, helically winding the stranded conductors around a winding spindle according to a Roebel transposition so as to form a conductor loop, the winding spindle having a profile adapted to a final cross sectional shape of the conductor bar;

in a third step, removing the winding spindle from the conductor loop; and in a fourth step, performing a press-forming procedure on the conductor loop so as to give the conductor loop the final cross sectional shape, and further comprising wrapping at least every second one of the stranded conductors with a thin, stretchable filament or tape prior to the second step so as to protect the individual wires during the winding step.

36. A method for producing a conductor bar of transposed stranded conductors for a large, rotating electric machine, the method comprising:

in a first step, cabling a plurality of electrically insulated individual wires so as to form a plurality of identical stranded conductors each having an essentially circular cross section;

in a second step, helically winding the stranded conductors around a winding spindle according to a Roebel transposition so as to form a conductor loop, the winding spindle having a profile adapted to a final cross sectional shape of the conductor bar;

in a third step, removing the winding spindle from the conductor loop; and in a fourth step, performing a press-forming procedure on the conductor loop so as to give the conductor loop the final cross sectional shape, further comprising helically winding each stranded conductor with an electrically insulating tape prior to the second step.

37. The method as recited in claim 36, wherein the insulating tape includes a stretchable fabric permeable to impregnating resin, and wherein the tape is stretched as it is wound onto the stranded conductor.

38. The method as recited in claim 36, wherein the insulating tape has a thickness ranging from 0.03 mm to 0.1 mm and includes a yarn or fabric including polyester fibers.

* * * * *